United States Patent Office 3,738,845
Patented June 12, 1973

3,738,845
PROCESS FOR THE MANUFACTURE OF
SUGARLESS CONFECTIONS
Jerome T. Liebrand, Farmingdale, N.Y., assignor to
Pfizer Inc., New York, N.Y.
No Drawing. Filed Jan. 7, 1972, Ser. No. 216,229
Int. Cl. A23g 3/00
U.S. Cl. 99—134 R
4 Claims

ABSTRACT OF THE DISCLOSURE

A process for the preparation of clear sorbitol hard candies is described which prevents the crystallization of sorbitol by the addition of an organic acid, such as citric acid, prior to the completion of the cooking step.

BACKGROUND OF THE INVENTION

This invention relates to a process for preparing confectionery compositions, but particularly to a process for preparing clear sorbitol hard candies.

Sorbitol hard candies are usually made by cooking a commercially available 70% w./w. sorbitol aqueous solution at a temperature of at least 300° F.; leaving essentially pure sorbitol. This mass is then cooled to a temperature of about 150° to 200° F. Flavors, coloring agents, gums and organic acids used as acidifiers, for example, citric acid and malic acid, are then mixed in. The mixture is then cast into candy molds and put aside to cool and set until hard. Candies made in this manner tend to exhibit some degree of opacity due to crystallization of sorbitol.

U.S. Pat. No. 3,438,787 discloses a clear confection of sorbitol and mannitol prepared by seeding a substantially anhydrous melt of the ingredients and then allowing the seeded melt to solidify under controlled conditions of temperature and humidity.

SUMMARY OF THE INVENTION

The present invention discloses an improved procedure for the preparation of hard sorbitol candies which prevents the aforementioned crystallization of sorbitol by addition of an organic acid, such as citric acid, prior to the completion of the cooking step which is carried out to a temperature of at least 300° F.

DETAILED DESCRIPTION OF THE INVENTION

In accordance with the process of this invention, sorbitol in aqueous solution, usually about 70% w./w., is heated to boiling and the heating is continued with a resulting loss in water until the temperature increases to within the range of 300° to 350° F. At this point a vacuum may be applied to remove any free water in the mass. If desired, heat may also be applied during the vacuum step. The moisture content of the product after cooking is less than 5%.

Prior to heating or at any convenient point during the cooking process, an organic acid, such as citric acid, lactic acid, tartaric acid or malic acid, is added and stirred in. However, the preferred acid is citric acid. The concentration used is preferably from about 0.5% to 5% by weight of the mixture. Normally, therefore, the concentration of organic acid used will be dependent on the flavoring characteristics desired. The acid may be added dry, for example, as a powder, or as a concentrated aqueous solution. The exact point during the cooking process at which the organic acid is introduced is not critical, and excellent results are obtained whether it is added at the outset or, say as late as fifteen minutes before the end of the cooking step. Upon cooling, the resulting candies are crystal clear and free from the objectionable opacity or cloudiness usually encountered.

Example I 500 gm. of a 70% sorbitol solution were heated to 310° F. in a cooking kettle. To this was then added 10 gm. of citric acid. Vacuum was then applied and the mixture was reheated to 300° F. The mixture was then cooled to 190° F., at which temperature a flavoring agent and coloring agent were added. This mixture was then deposited into candy molds and allowed to reach room temperature, producing a clear hard candy free of crystallization.

Example II

Similar results are obtained following the procedure of Example I, using lactic, tartaric and malic acids instead of the citric acid.

Example III

Citric acid (5 gm.) was dissolved in 500 gm. of a 70% sorbitol solution and cooked to a temperature of 310° F. Vacuum was then applied and the mixture was reheated to 300° F. The mixture was then cooled to 180° F., at which time flavoring agent and coloring agent were added. The mixture was then deposited into candy molds and allowed to reach room temperature, producing a clear hard candy free of crystallization.

Example IV

Citric acid (6 gm.) was dissolved in 500 gm. of a 70% sorbitol solution and cooked to a temperature of 325° F. The mixture was then cooled to 180° F., at which time a flavoring agent and coloring agent were added. The mixture was then deposited into candy molds and allowed to reach room temperature, producing a clear hard candy free of crystallization.

Example V

The procedure of Example I was followed using 1.8 gm. of citric acid, with similar results obtained.

Example VI

The procedure of Example III was followed using 18 gm. of citric acid with similar results obtained.

Example VII 500 gm. of a 70% sorbitol solution were heated to 310° F. in a cooking kettle. The mixture was then cooled to 190° F., at which temperature 10 gm. of citric acid, a flavoring agent and a coloring agent were added. This mixture was then poured into candy molds and allowed to reach room temperature. The resulting hard candy exhibited crystallization of sorbitol on the surface as compared to the candies prepared in the previous examples, which were all free of crystallization.

What is claimed is:
1. In a method of preparing a hard candy composition wherein an aqueous solution of sorbitol is heated at a temperature of at least 300° F., an organic acid is added thereto, and the resultant mixture is cast into candy molds, the improvement comprising blending said organic acid with said sorbitol solution prior to the completion of said heating.

2. The process of claim 1 wherein said acid is selected from the group consisting of citric acid, lactic acid, tartaric acid and malic acid.

3. The process of claim 2 wherein said acid is citric acid.

4. The process of claim 1 wherein said acid is added in a concentration of from about 0.5% to 5% by weight of said resultant mixture.

References Cited
UNITED STATES PATENTS

| 3,438,787 | 4/1969 | Du Ross | 99—134 R |
| 3,556,811 | 1/1971 | Smith | 99—134 R |
| 3,632,357 | 1/1972 | Childs | 99—134 R |

ALVIN E. TANENHOLTZ, Primary Examiner

J. M. HUNTER, Assistant Examiner